(12) United States Patent
Reiser et al.

(10) Patent No.: US 7,504,170 B2
(45) Date of Patent: Mar. 17, 2009

(54) FUEL CELLS EVAPORATIVELY COOLED WITH WATER CARRIED IN PASSAGEWAYS

(75) Inventors: Carl A. Reiser, Stonington, CT (US); Jeremy P. Meyers, West Hartford, CT (US); David D. Johnson, Champagne, IL (US); Craig E. Evans, Vernon, CT (US); Robert M. Darling, South Windsor, CT (US); Tommy Skiba, East Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 826 days.

(21) Appl. No.: 11/027,332

(22) Filed: Dec. 29, 2004

(65) Prior Publication Data

US 2006/0141330 A1 Jun. 29, 2006

(51) Int. Cl.
*H01M 8/04* (2006.01)
(52) U.S. Cl. .............................. 429/26; 429/24; 429/34; 429/38
(58) Field of Classification Search .................. 429/23, 429/24, 26, 34, 38, 39
See application file for complete search history.

(56) References Cited

U.S. PATENT DOCUMENTS

| | | | | |
|---|---|---|---|---|
| 4,729,930 A * | 3/1988 | Beal et al. ................. | 429/23 X |
| 5,700,595 A * | 12/1997 | Reiser ....................... | 429/26 X |
| 6,764,781 B2 * | 7/2004 | Hoch ........................ | 429/26 X |
| 6,770,394 B2 * | 8/2004 | Appleby et al. ............... | 429/34 |
| 6,890,673 B2 * | 5/2005 | Higashiyama et al. ..... | 429/24 X |
| 7,112,379 B2 * | 9/2006 | Skiba ........................ | 429/34 X |
| 2004/0170878 A1 * | 9/2004 | Goebel ........................ | 429/26 |
| 2006/0046123 A1 * | 3/2006 | Guo et al. .................. | 429/39 X |

* cited by examiner

*Primary Examiner*—Stephen J. Kalafut
(74) *Attorney, Agent, or Firm*—M. P. Williams

(57) ABSTRACT

Fuel cells (38) have minute water passageways (67) that provide water through one or both reactant gas flow field plates (74, 82) of each fuel cell, whereby the fuel cell is cooled evaporatively. The water passageways (67; 78, 85; 78a, 85a) may be vented by a porous plug (69), or by a microvacuum pump (89) that does not pump any water from the passageways, or simply vented (99) to atmosphere. A condenser (59) may have a contiguous reservoir (64); the condenser (59) may be vertical, such as a vehicle radiator (FIG. 1), or may be horizontal, contiguous with the top of the fuel cell stack (37, FIG. 5). The passageways may be grooves (76, 77; 83, 84) in the reactant gas flow plates (75, 81) or the passageways may comprise a plane of porous hydrophilic material (78a, 85a) contiguous with substantially the entire surface of one or both of the reactant gas flow field plates.

17 Claims, 5 Drawing Sheets

FUEL CELLS EVAPORATIVELY COOLED WITH WATER CARRIED IN PASSAGEWAYS

TECHNICAL FIELD

This invention relates to fuel cells having water passageways that provide water to reactant gas flow passages wherein the water is evaporated in proportion to the waste heat generated in the cells; the water condensed from the exhausted reactant gas is returned to the water passageways, which may be dead-ended or vented, that receive condensate from a condenser which removes water from the air exhausting the cells.

BACKGROUND ART

It is known in the fuel cell art to evaporatively cool fuel cells, thereby deriving the benefit of the heat of vaporization, in contrast with conveying sensible heat to circulating water passing through the cells or coolant passing through coolant plates. Typically, prior approaches to evaporative cooling have taken one of two forms. In a first form, water is abundantly atomized or fogged into the gas stream of one or both of the reactant gases.

The other form of prior approaches utilizes wicking to bring water into the cells. One recent example is shown in U.S. publication 2004/0170878, which is briefly illustrated in FIG. 1 herein. A fuel cell 11 has strips of wicking 12 disposed over a diffusion layer 13 which is in intimate contact with the cathode catalyst in the membrane electrode assembly (MEA) 14. The fuel cell 11 includes an anode 18, which in the subject publication is not involved with cooling. The fuel cell is separated from the next cell in the series 20 by a separator plate 21. A similar separator plate is present, though not shown, on the top of the fuel cell as seen in FIG. 1.

To provide water to the wicking 12, a wicking header 22 extends across the ends of all of the fuel cells on an end thereof which is opposite to the flow of air into the spaces 24 between the wicking 12 that comprise the oxidant reactant gas flow field. Air is supplied by a pump 26 through a manifold 27 to the inlets 28 of each fuel cell.

In FIG. 1, the air flow is exhausted through an outlet header 31 to a condenser 32 which vents the air to exhaust and delivers the condensate to a reservoir 33. Water in the reservoir 33 is conducted to the wicking header 22.

The wicking evaporative cooling described in the aforementioned publication is stated to require external water, from a source outside the fuel cell power plant, since the water generated at the cathode (process water) is said to be insufficient, except at startup, to achieve the necessary cooling. This is also true in an evaporatively cooled fuel cell stack which relies on wicking in U.S. Pat. No. 4,826,741. Therein, 100 $cm^2$ cells have performance of only 0.7-0.8 v at 100-120 $mA/cm^2$ (108-130 $A/ft^2$). Furthermore, the capillary pressure differential along the length of each of the wicks must be greater than the pressure drop along the adjacent air flow field channels in order for there to be a positive wicking velocity, although it is stated that having air flow in the same direction as the flow of water in the wicking means would overcome that problem.

Thus, evaporative cooled fuel cells that rely on wicking require external water, have limited planform size and the performance thereof is limited by small current density.

In order to transport sufficient water to provide the necessary evaporative cooling, from the wicking header 22, located at the perimeter of the cells, to all areas of the cells requiring cooling, the wicking required is considerable, causing each fuel cell to be thicker than is acceptable within the limited volume which is mandated for use in vehicular applications.

DISCLOSURE OF INVENTION

Objects of the invention include: fuel cells which are thinner than fuel cells known to the prior art; the use of evaporative cooling in fuel cells in which the supply of water to the fuel cells is controllable independently of the pressure in the air supply; evaporative cooling of fuel cells in which the supply of water to the cells is independent of the supply of reactant gas to the membrane electrode assembly of the fuel cells; evaporatively cooled fuel cells capable of having large area planform and capable of operating with high current densities; and improved fuel cells for vehicular and other applications.

According to the present invention, fuel cells in a fuel cell power plant are evaporatively cooled by means of water present in minute passageways which are adjacent to or within a first surface of the hydrophilic porous reactant gas flow field plates which have reactant gas flow channels opening at a second surface of the flow field plate, opposite to said first surface. Each minute passageway is in fluid communication with a water reservoir.

In accordance with a preferred embodiment of the present invention, the water supply to the minute passageways may be further enhanced by means of a micro vacuum pump. The pump does not create any water flow; it simply provides a correct pressure in the portions of the passageways at the top of the stack to assure that the water level will reach the highest part of the passageways in the stack. However, the invention may be practiced with the water passageways dead-ended.

In accordance with another optional embodiment of the invention, a fuel cell stack utilizing evaporative cooling with water supplied in minute passageways at the surface of hydrophilic porous reactant gas channel plates may be operated with fixed air flow, in contrast with a fixed air utilization, the air flow being sufficient to control the maximum stack temperature at moderately high current densities. In further accord with this optional embodiment of the invention, the air flow rate may be controlled in stages, in dependence upon the temperature within the fuel cells.

In the invention, water passes through the flow field plate perpendicular to the plane thereof, whereas wicking of the prior art conducts water in parallel with the plane of the fuel cells. Therefore, the water travels only a very short distance through porous material, typically less than 0.5 mm.

The invention allows managing the water for evaporative cooling separately from the pressure drop across reactant gas flow path into which the water will migrate. The invention allows individual fuel cells to be thinner than those of comparable performance known to the prior art.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
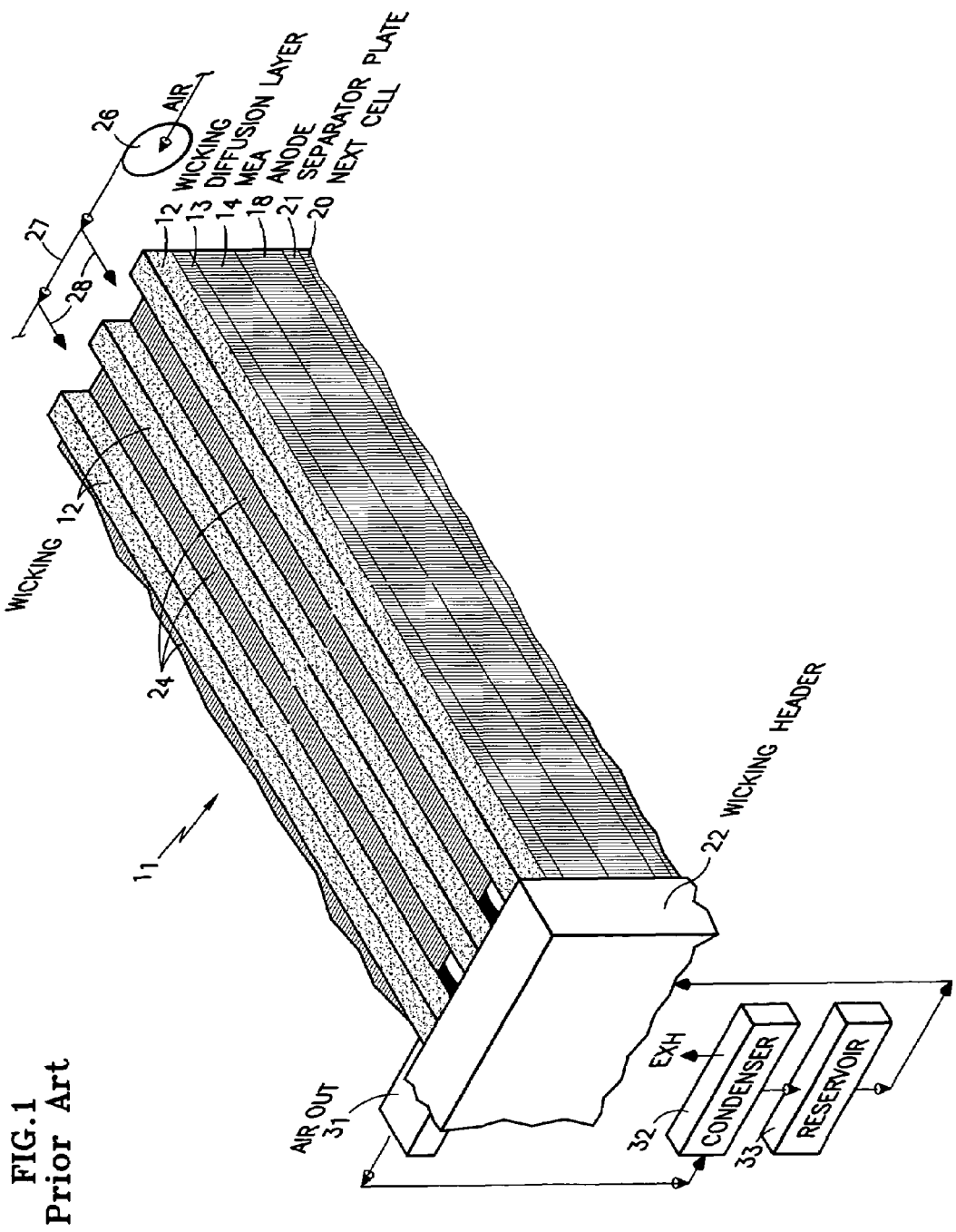
FIG. 1 is a partial, perspective illustration of an evaporatively cooled fuel cell employing wicking known to the prior art.
Figure 2:
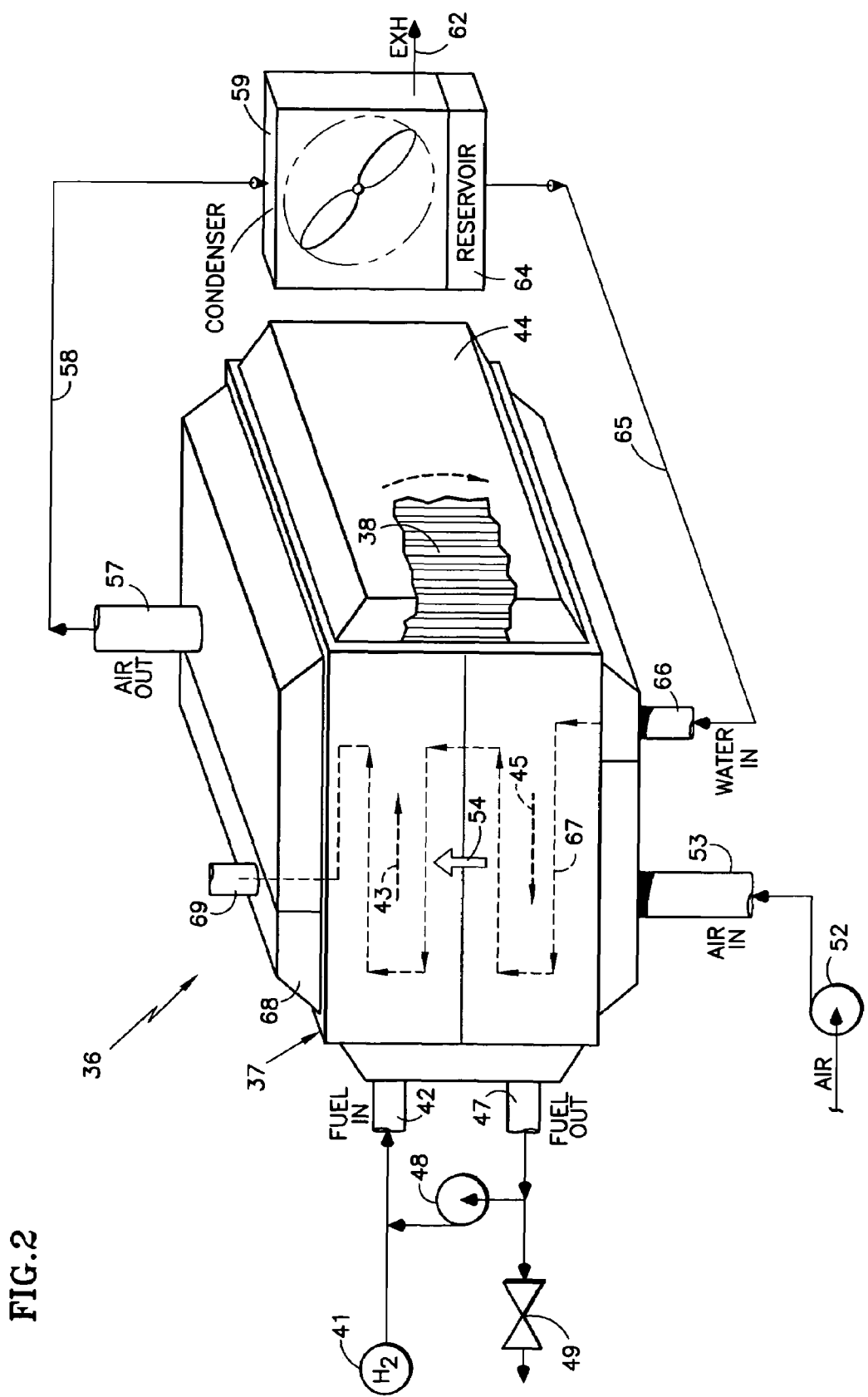
FIG. 2 is a simplified perspective view of a fuel cell power plant employing the present invention.

Referring now to FIG. 2, a fuel cell power plant 36 according to the present invention includes a stack 37 of fuel cells 38 which are shown disposed vertically, although they may be disposed horizontally.

In this embodiment, fuel from the source 41 is provided to a fuel inlet 42 and flows to the right in a first fuel pass, as indicated by the bold arrow 43, to a fuel turn manifold 44. The fuel gas then flows downwardly and into a second fuel pass of the fuel flow fields, wherein the fuel gas flows to the left as indicated by the bold arrow 45. From a fuel outlet 47, the fuel may flow through a recycle pump 48 (perhaps with valves not shown) back to the fuel inlet 42, and may be periodically purged to ambient through a valve 49, all as is known in the art. Single pass, triple pass or other fuel flow configurations may be used.

In the embodiment of FIG. 2, air is provided by a pump 52 to an air inlet 53, and the air flows upwardly through the oxidant reactant gas flow channels of the fuel cells 38, as indicated by the hollow arrow 54. From an air outlet 57, the air flows over a conduit 58 to a condenser 59, which in a vehicle may be a conventional radiator. The exit air is passed through an exhaust 62. The condensate from the condenser 59 may be accumulated in a reservoir 64, which is connected by a water return conduit 65 to a water inlet 66. The water then flows through minute passageways 67 into each of the fuel cells 38; the passageways 67 may terminate in a vent manifold 68, from which removal of gas from the passageways is provided through a vent, such as a porous plug vent 69.

Figure 3:
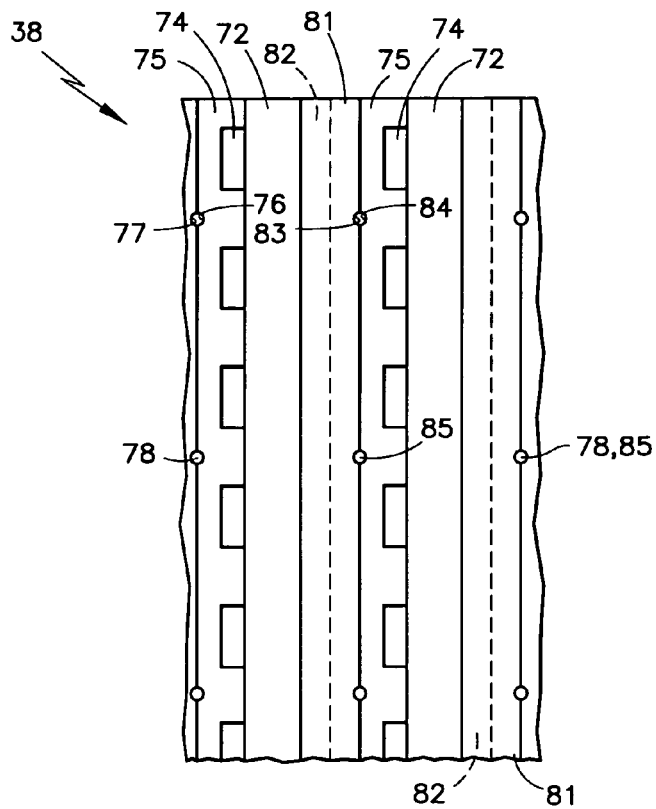
FIG. 3 is a partial, sectioned side elevation view of a pair of fuel cells employing the present invention, with sectioning lines omitted for clarity.

Although there is a water inlet 66, there is no water outlet, the water is simply present in each fuel cell as described more fully with respect to FIG. 3. In FIG. 3, one embodiment of the invention includes fuel cells 38, each of which comprises a conventional membrane electrode assembly 72, which includes an electrolyte with anode and cathode catalysts on opposite sides thereof.

In the embodiment of FIG. 3, fuel reactant gas flows through channels 74 in a hydrophilic porous substrate 75, which in this embodiment includes grooves 76, which together with grooves 77 of an adjacent fuel cell, form a minute water passageway 78. On the cathode side, an oxidant reactant gas flow field plate 81 includes air flow channels 82 and grooves 83 which, with grooves 84 on an adjacent fuel cell, together form minute passageways 85.

To prevent flooding, it is preferable that the reactant gases be at least a few kP (a fraction of a psi) higher than the pressure of water in the passageways. This will naturally occur as a consequence of the air pump 52 generally causing the air to be that much above atmospheric pressure, and the pressure of the fuel is easily regulated, as is known. In the embodiment of FIG. 2, the water in the conduit 65 is at atmospheric pressure. However, the water could be provided at a pressure other than atmospheric, by a variety of conventional means, provided the reactant gases have a slightly higher pressure as described. If appropriate in any circumstance, the accumulator 64 may be eliminated and the condenser condensate fed directly to the water inlet 66.

In other embodiments, the passageways may be formed other than by matching grooves as shown. Water passageways 67 may be provided in only one of the reactant gas flow field plates 75, 81. The invention may be used in fuel cell stacks having separator plates; or if deemed necessary, cooler plates, in which case the coolant flow therein is fully independent of the evaporative cooling of the present invention.

The reactant gas flow field plates 74, 81 appear to be the same as water transport plates, sometimes referred to as fine pore plates, in a fuel cell power plant which utilizes significant water flow through the water transport plates, with external water processing, as is disclosed in U.S. Pat. No. 5,700,595. However, because of the fact that there is about a one hundred-to-one cooling effectiveness per volume of water when evaporative cooling is used, in comparison with sensible heat, water flow cooling of the aforesaid '595 patent, the flow channels In the prior art have cross sections which are several tens of times larger than the cross sections of the water passageways 78, 85 of the invention. In addition, the spacing of the lateral portions of the water passageways 78, 85 (shown at each juncture of the fuel cells in the embodiment of FIG. 3) and similar flow passageways in other embodiments, may be separated by a distance which is several times greater than the spacing between lateral portions of water flow channels in sensible heat, water flow cooling systems, as in the aforesaid '595 patent. The small cross section of the passageways 74, 81, and the large distance between successive lateral portions thereof permit the thickness of the reactant gas flow field plates to be reduced by about one-third.

Figure 4:
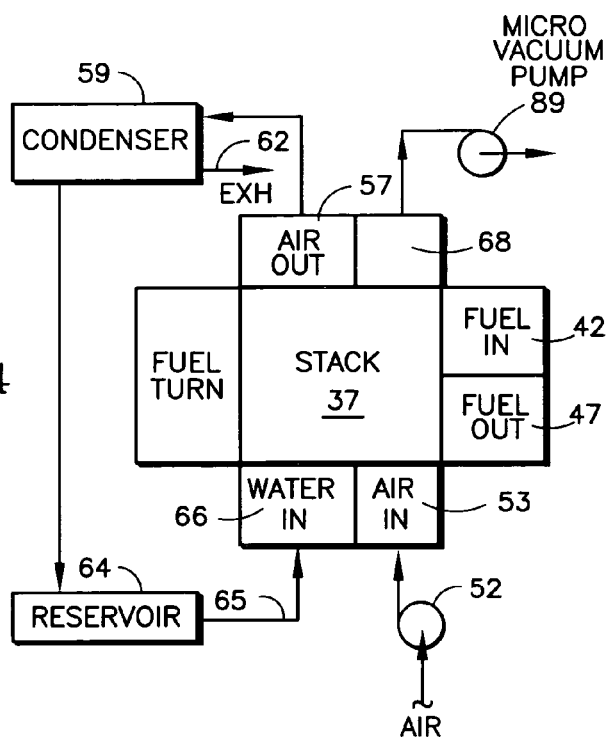
FIG. 4 is a simplified block diagram of a vented embodiment of the invention.

Another embodiment of the invention is illustrated in FIG. 4. Therein, the vent manifold 68 is connected to a micro vacuum pump 89, of the type utilized for a 37 liter (10 gallon) aquarium, which can be bought for several dollars, for the sole purpose of supplying sufficient head to ensure that the water level reaches the uppermost portions of the passageways in the stack 37. The pump 89 does not cause any water flow through the vent manifold 68.

Figure 5:
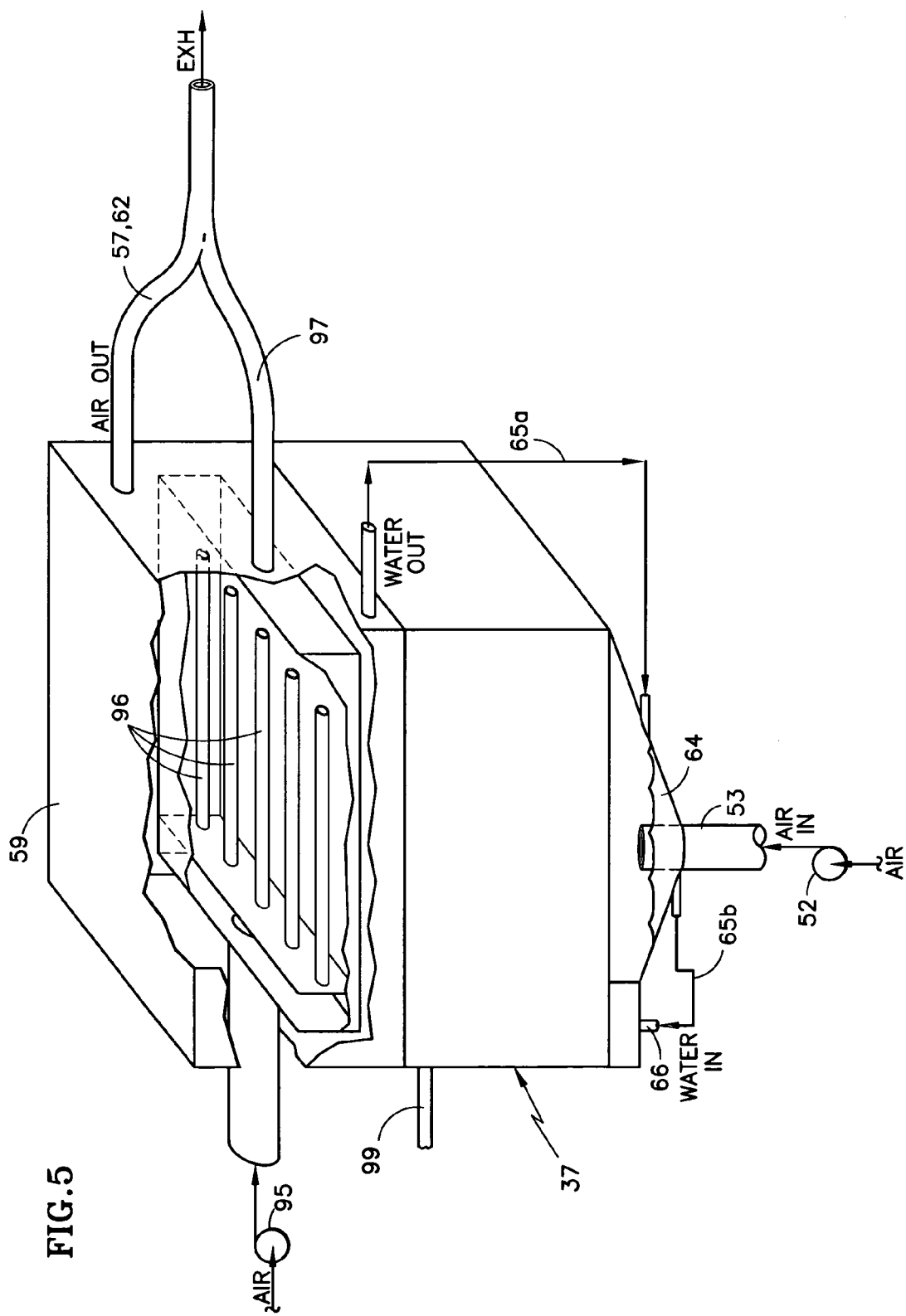
FIG. 5 is a partial illustration of an embodiment of the fuel cell power plant 36 of FIG. 2, in which the air outlet manifold comprises a condenser disposed contiguously with the top of the fuel cell stack.

In FIG. 5, the fuel cell stack has a condenser 59 disposed contiguously across the top thereof, said condenser 59 comprising an air outlet manifold. To cool the air as it exits the stack so as to condense the water entrained therein, a blower 95 pumps air through a plurality of cooling tubes 96, the outflow of which 97 passes to exhaust. The condensate is delivered on the line 65a to a reservoir 64 which comprises a combined accumulator/air inlet manifold, which is connected to the water inlet 66 by a conduit 65b. Should the water in the reservoir 64 not provide adequate head so that the highest portions of the passageways 67 have water therein, then the passageways 67 may be connected to a vent 99 to reference the water pressure to atmospheric pressure; or it may be connected through the vent 99 to a micro vacuum pump 89 (FIG. 4), simply to supply additional head, as described with respect to FIG. 4 hereinbefore. In FIG. 5, the fuel components have been omitted for clarity.

Figure 6:
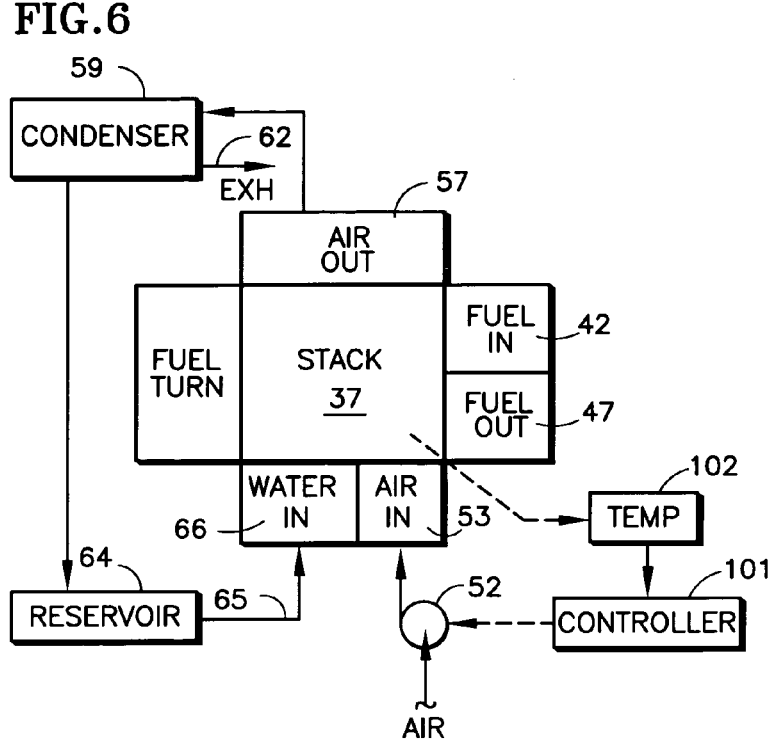
FIG. 6 illustrates controlling air flow as a function of temperature.

In FIG. 6, a controller 101 will regulate the flow of air depending on the temperature 102 of one or more cells of the stack. The control could be continuous or in stages. Or, if desired, the control could simply be to maintain a constant air flow (rather than maintaining constant air utilization) to ensure sufficient evaporative cooling to maintain the desired temperature set point.

Figure 7:
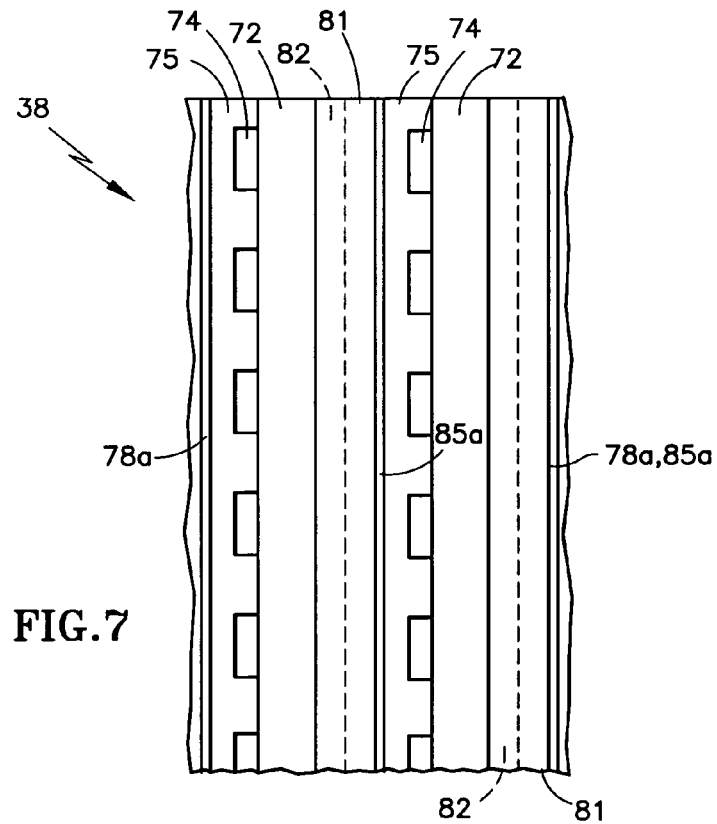
FIG. 7 is a partial, sectioned side elevation view of a pair of fuel cells employing a water permeable plane in the present invention, with sectioning lines omitted for clarity.

FIG. 7 illustrates another embodiment of the invention; in place of grooves forming passageways, there is a material 78a, 85a, which is conductive, hydrophilic and has a high in-plane permeability to water. Such material may be carbon fiber paper, with fibers aligned in the direction of water motion, or it may be other material conventionally used as fuel cell diffusion media. This contrasts with the prior art in which the plane itself is impermeable, with strips of water permeable material defining air flow channels. In that case, any water pressure will cause flooding. In the invention, the reactant gas pressure can be higher than the water pressure to avoid flooding, while the pressure (head) of water can be whatever is reasonably necessary to assure replenishment.

Water may be drained from passageways and the condenser at shut down in cold climates, if desired.

The aforementioned patent application and patent are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant including a stack of fuel cells, each fuel cell comprising:
   an electrolyte having cathode and anode catalysts disposed on opposite sides thereof;
   a fuel reactant gas flow field plate having fuel reactant gas flow channels along a first surface thereof;
   an oxidant reactant gas flow field plate having oxidant reactant gas flow channels on a first surface thereof;
   at least one of said flow field plates being porous and hydrophilic;
   a water passageway disposed on a second surface of said at least one flow field plate which is opposite to said first surface thereof, said water passageway either being (a) dead-ended within the corresponding fuel cell or (b) vented, said water passageway consisting of either (c) a groove in said at least one plate or (d) a material contiguous with substantially all of said second surface, said material being conductive and hydrophilic and having an in-plane permeability to water,
   said fuel cell power plant further comprising:
   a source of fuel in fluid communication with said fuel reactant gas flow channels;
   a source of air in fluid communication with said oxidant reactant gas flow channels; and
   a condenser connected to a reactant gas exit of said at least one of said reactant gas flow field plates of each of said fuel cells, the condensate of said condenser in fluid communication with a proximal end of the water passageway in each of said fuel cells, whereby water migrates from said water passageways through said at least one hydrophilic, porous reactant gas flow field plates into the reactant gas channels thereof, and is evaporated by heat generated in said fuel cells to cool said fuel cells, the water therein being recycled through said condenser to return to said passageways.

2. A fuel cell power plant according to claim 1 wherein:
   each fuel cell has a groove in said first surface of both said fuel reactant gas flow field plate and said oxidant reactant gas flow field plate, which are, when the fuel cell stack is assembled, in proximity with each other to thereby form said water passageways.

3. A fuel cell power plant according to claim 1 wherein:
   said condenser is disposed separately from said fuel cell stack.

4. A fuel cell power plant according to claim 1 wherein:
   the air flow in said condenser is vertical.

5. A fuel cell power plant according to claim 1 disposed in a vehicle wherein:
   said condenser comprises a vehicle radiator.

6. A fuel cell power plant according to claim 5 wherein:
   said condenser has a water reservoir disposed contiguously at the bottom thereof.

7. A fuel cell power plant according to claim 1, further comprising:
   a water reservoir receiving said condensate, said passageways in fluid communication with said reservoir.

8. A fuel cell power plant according to claim 1 wherein:
   said water passageways are each connected to a vent at distal ends thereof opposite said proximal ends.

9. A fuel cell power plant according to claim 8 wherein:
   said vent is at atmospheric pressure.

10. A fuel cell power plant according to claim 8 wherein:
    the liquid pressure at said vent is less than or equal to the water pressure at the condenser exit.

11. A fuel cell power plant according to claim 10 wherein:
    the liquid pressure difference is achieved by a backpressure of the condenser exhaust gas, such that the pressure of the condenser exhaust gas pushes water into the water passageways.

12. A fuel cell power plant according to claim 10, further comprising:
    a water reservoir receiving said condensate, said passageways in fluid communication with said reservoir; and wherein:
    the hydraulic pressure of the water in the condenser pushes water into the water passageways.

13. A fuel cell power plant according to claim 8 further comprising:
    a microvacuum pump connected to said vent and operated in a manner to ensure coolant level reaches the uppermost portions of said water passageways without creating flow of water through said vent.

14. A fuel cell power plant according to claim 1 wherein:
    said condenser is contiguous with and covers the top of said fuel cell stack.

15. A fuel cell power plant according to claim 1 wherein:
    said stack of fuel cells includes an air inlet manifold, the condensate of said condenser being in fluid communication with said air inlet manifold, whereby said air inlet manifold serves as a reservoir, said water passageways being in fluid communication with the water in said reservoir.

16. A fuel cell power plant according to claim 1 wherein:
    water migrates into the air flowing in said oxidant reactant gas channels and the air flow in said channels is held constant at all power levels.

17. A fuel cell power plant according to claim 1 wherein:
    water migrates into the air flowing in said oxidant reactant gas channels and the air flow in said channels is controlled as a function of cell temperature.

* * * * *